United States Patent

[11] 3,547,167

| [72] | Inventor | Adolf Raetz,<br>Korbim Remstal, Germany |
|---|---|---|
| [21] | Appl. No. | 680,081 |
| [22] | Filed | Nov. 2, 1967 |
| [45] | Patented | Dec. 15, 1970 |
| [73] | Assignee | Andreas Stihl Machinenfabrik<br>Neustadt-Waiblingen, Germany |
| [32] | Priority | Nov. 25, 1966 |
| [33] |  | Germany |
| [31] |  | No. ST 26156 |

[54] CUTTING TOOTH LINK
13 Claims, 3 Drawing Figs.

[52] U.S. Cl. .................................................. 143/135,
143/147
[51] Int. Cl. ...................................................... B27b 33/14
[50] Field of Search ........................................... 143/135,
145, 148, 147

[56] References Cited
UNITED STATES PATENTS
2,746,494  5/1956  Cox ............................ 143/135
2,755,828  7/1956  Dunnington.................... 143/135
2,994,350  8/1961  Lundberg..................... 143/135X FOREIGN PATENTS
738,106  10/1955  Great Britain................ 143/135

*Primary Examiner*—Donald R. Schran
*Attorney*—Walter Becker

ABSTRACT: A cutting tooth link having a first section forming an elongated link body with a bottom surface for guidance in a guiding rail, a second section arranged at one end portion of said first section and extending in a direction transverse to the longitudinal direction and approximately in the plane of said first section and away from said bottom surface, and a stud protruding from said second section and extending in spaced relationship to and in the longitudinal direction of said first section while said two sections and said stud form a single integral piece with each other, said stud extending into a cutting body and having the latter firmly connected to said stud.

PATENTED DEC 15 1970  3,547,167

Inventor:
Adolf Rätz

CUTTING TOOTH LINK

The present invention relates to a cutting tooth link for saw chains, especially for motor chain saws, with a cutting body which is detachably connected to the cutting tooth link by means of a plug connection having one degree of freedom only.

Cutting tooth links of this type are known and disclosed for instance in U.S. Pat. No. 2,978,000, according to which the cutting body has a stud machined thereon which is adapted to be inserted into a sleeve-shaped plate of the cutting tooth link. This design has the drawback that the cutting body is composed of two sections which differ as to their spacial shape, namely a plug section and a cutting section, so that the structure of the cutting tooth link is relatively complicated and expensive. In view of the fact that the cutting body has two different sections of which only one is suitable for forming the cutting edge of the cutting tooth link, also only a relatively small postgrinding potential prevails by which the cutting body can be postground until it becomes no longer usable. A further disadvantage of this known cutting tooth link consists in that under high loads, as they occur for instance during the cutting operation, the cutting body is not safely held. The sleeve which is formed by bending a plate of the link body for insertion of the shank or stud of the cutting body may during the cutting operation bend open slightly whereby a proper play-free hold of the cutting body is no longer assured with the result that the cutting body may during the circulation of the saw chain on the guiding rail of a motor chain saw slip off said link body. The heretofore known cutting links also have a relatively great weight.

It is, therefore, an object of the present invention to provide a cutting tooth link in which the cutting body, while being of simple construction, will assure a proper hold of the cutting body on the cutting tooth link.

It is another object of this invention to provide a cutting tooth link with a cutting body which can be postground numerous times and will have a long life.

It is a further object of this invention to provide a cutting tooth link as set forth in the preceding paragraphs, which will be of low weight and which will be inexpensive to manufacture.

These and other objects and advantages of the invention will appear more clearly from the following specification in connection with the accompanying drawing, in which.

Figure 1:
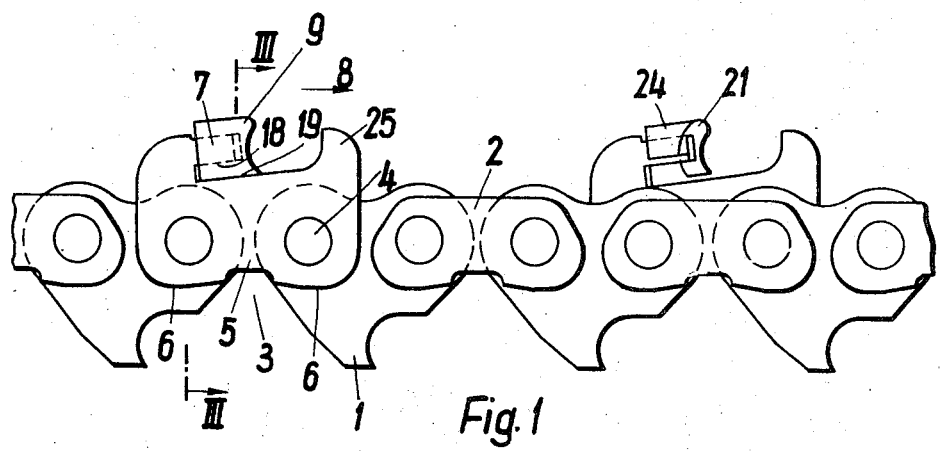
FIG. 1 is a side view of a portion of a chain saw comprising cutting tooth links according to the present invention.

The cutting tooth link according to the present invention is characterized primarily in that the link body of the cutting tooth link has a freely protruding stud which extends into a corresponding recess provided in the cutting body placed upon said cutting tooth link. This structure permits a simple design of the link body which merely has to have an insertable plug and which makes it possible that the cutting body will be designed over its total length with the same cross section so that the cutting body can be produced in a simple manner and can be postground numerous times.

According to a further feature of the invention, the said stud extends approximately in the cutting direction, preferably parallel to the back surface of the cutting edge of the cutting tooth link so that the cutting body will, in view of the cutting pressure occurring during the cutting operation, be pushed onto the stud whereby a safe fit of the cutting body will be assured.

The fit of the cutting body on the link body may furthermore be improved by clamping the cutting body onto the link body. In this instance, separate means, i.e. means separate from the cutting tooth link, are not required for connecting the cutting body. The cutting body is clamped between at least one surface of the stud and one surface of the link body.

Advantageously, that edge of the stud which faces the link body is located opposite an edge of the link body while the cutting body is clamped between the said two edges so that a stable construction of the cutting tooth link is obtained. This clamping effect can be realized in a simple manner when both edges taper in a direction opposite to the cutting direction. Advantageously, that portion of the cutting body which is located between the said two edges has at least over a portion of its length a conicity corresponding to the taper.

According to a further development of the invention, the cutting body or cutting edge body is selectively placeable upon the stud in at least two different positions so that the cutting body may be turned over in the manner of a turnable cutting plate whereby a long life of the cutting body will be realized. The cutting body may at both ends be provided with cutting edges and may be placeable upon the stud in two positions offset with regard to each other by 180°. It is also possible to design at least two edges and one end of the cutting body as cutting edges while the cutting body in such an instance is placeable upon the stud in correspondingly tilted positions.

The cutting body may be secured on the link body in a simple manner against rotation by providing the stud with a rectangular or square cross section.

In order, in spite of great finishing tolerances, to assure a firm press fit of the cutting body on the link body, the cutting body is preferably designed as a longitudinally slotted sleeve while the longitudinal slot is expediently located approximately in the same plane as the inner surface of that side of the quadrangle which faces the link body and belongs to the cutting sleeve which is of a substantially quadrangular cross section.

The cutting tooth link according to the invention may, similar to heretofore known cutting tooth links, be postground by means of a round or similar file when the chest surface of the cutting body viewed from the side, preferably at an angle to the plane of the link body, is concave or semicircular.

The cutting tooth link according to the invention is advantageously designed as a lateral link of a saw chain. In this instance the longitudinal slot of the cutting sleeve is advantageously provided on the inside of the cutting tooth link so that the cutting body has a smooth outer lateral cutting edge. The link body may, ahead of the stud, be provided with a depth-limiting extension.

According to a further development of the invention, the link body and/or the cutting body may be designed as stampings so that they can be produced at low cost.

Referring now to the drawing in detail, the saw chain according to the invention primarily comprises central links 1 which are alternately by means of lateral plates or links 2 and cutting tooth links 3 pivotally connected to each other by chain rivets 4. The cutting tooth links 3 forming lateral chain links are arranged alternately on both sides of the saw chain.

The cutting tooth links 3 include a link body 5 which comprises the recesses or bores for the chain rivets 4 and has running surfaces 6 for guiding the chain on a guiding rail of a motor chain saw.

On that side of the link body 5 which faces away from the running surfaces 6, the link body 5 is provided with a freely protruding stud 7 which forms a single piece with the link body 5. The stud 7 freely protrudes approximately in the cutting direction of the cutting tooth link, said cutting direction being indicated by the arrow 8. The stud 7 is located primarily behind (when viewed in the cutting direction of the chain) the central transverse plane between the two rivet axes of the rivets 4. According to the embodiment shown in the drawing, the stud 7 is located in the same plane as the link body 5.

Figure 3:
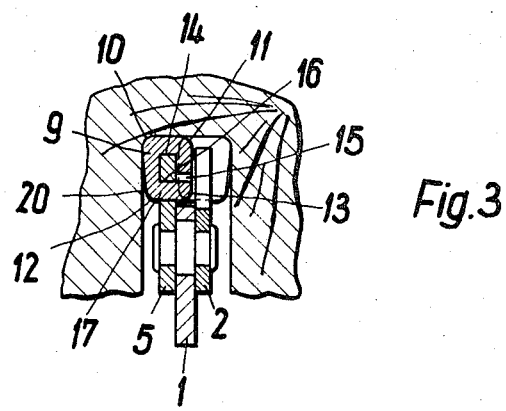
FIG. 3 is a transverse section taken along the line III-III of FIG. 1.

Placed upon the stud 7 of the link body 5 is a cutting sleeve 9 which is of uniform cross section throughout its entire length. The cutting sleeve 9 is, according to the embodiment shown in the drawing, provided with a quadrangular cross section with rounded longitudinal edges 10—13. In its longitudinal direction, the cutting sleeve 9 has a passage 14 (FIG. 3) the cross section of which in longitudinal direction is rectangular and corresponds to the cross section of the stud 7. The inner side of the cutting sleeve 9, i.e. that side which faces the central plane of the chain, is provided with a longitudinal slot 15 the lower side of which (with regard to FIG. 3) is located in the same plane as the inner surface 16 of that side 17 of the cutting sleeve 9 which faces the link body 5 so that this side 17 forms a freely protruding tongue. This tongue 17 is located between that edge 18 of stud 7 which faces the link body 5 and an edge 19 of the link body 5 which faces said edge 18 while the tongue 17 is clamped in between the said two edges 18 and 19. The two edges 18 and 19 taper toward each other in a direction counter to the cutting direction as indicated by the arrow 8 at a slight angle, for instance at an angle of from 3° to 4°, while the tongue 17 expediently has a corresponding conical shape at least over half of its length. If the tongue 17 is provided with two conical sections directed opposite to each other, the cutting edge body or sleeve 9 may be placed upon the stud 7 in two different positions offset with regard to each other by B180°.

Figure 2:
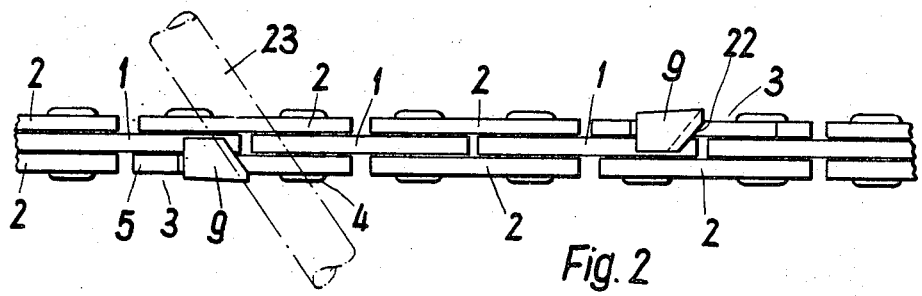
FIG. 2 is a top view of the chain saw according to FIG. 1.

The outer lateral surface of the body or sleeve 9 is inclined toward the link body 5 whereas the remaining outer surfaces of the cutting sleeve 9, when viewed in cross section, are perpendicular with regard to each other. The chest surface 21 of the cutting sleeve 9 which is concave, extends from the outside at an incline toward the rear and toward the respective chain side located opposite to the respective cutting tooth link 3 so that a correspondingly inclined roof edge 22 is obtained (FIG. 2). By designing the chest surface 21 of the cutting sleeve 9 in the above-mentioned concave manner, said cutting sleeve 9 can easily be postground with a round file indicated in dot-dash lines in FIG. 2.

As shown in FIG. 1, the stud 7 of the link body 5 extends substantially parallel with regard to the rear surface 24 of the cutting edge of the cutting sleeve 9. Stud 7 may taper toward its free end in a conical manner.

As will also be seen from FIGS. 1 and 2, the front end of the link body 5 is provided with a depth limitor 25.

The cutting body may in a simple manner also be produced by cutting it off from a correspondingly profiled long stock. In such an instance it is advantageous, following the cutting-off operation, to machine the cutting chest surface.

It is, of course, to be understood that the present invention is, by no means, limited to the particular construction shown in the drawing but also comprises any modifications within the scope of the invention.

I claim:

1. A cutting tooth link for saw chains which includes: a first section forming an elongated link body with a bottom surface for guidance in a guiding rail, a second section arranged at one end portion of said first section and extending in a direction transverse to the longitudinal direction and approximately in the plane of said first section and away from said bottom surface, a third section in the form of a stud protruding from said second section and extending in spaced relationship to and in the longitudinal direction of said first section, all of said sections forming a single integral piece with each other, and a cutting body having an opening therein corresponding in cross section to the cross section of said stud, said stud extending into said opening and having said cutting body firmly connected to said stud, said cutting body being clamped between a surface of said stud and a surface of said first section.

2. A cutting link according to claim 1, in which said stud extends approximately in the cutting movement direction of the cutting tooth link.

3. A cutting link according to claim 1, in which said stud extends substantially parallel to that surface of said first section which is located opposite said bottom surface.

4. A cutting link according to claim 1, in which said two surfaces of said cutting body and said first section between which said cutting body is clamped taper with regard to each other at an angle from 3° to 5° in a direction opposite to the cutting direction of said cutting body.

5. A cutting link according to claim 1, in which said first section is provided with two transverse bores spaced from each other in the longitudinal direction of said first section, and in which said stud when looking in the cutting direction of said cutting body is located at least to its major extent behind the plane which is parallel to and located substantially halfway between said two transverse bores.

6. A cutting tooth link for saw chains which includes: a first section forming an elongated link body with a bottom surface for guidance in a guiding rail, a second section arranged at one end portion of said first section and extending in a direction transverse to the longitudinal direction and approximately in the plane of said first section and away from said bottom surface, a third section in the form of a stud protruding freely from said second section and extending in spaced relationship complementary to and in the longitudinal direction of said first section, all of said sections forming a single integral piece with each other, and a cutting body having an opening therein corresponding in cross section to the cross section of said stud, said stud extending into said opening and having said cutting body firmly connected to said stud, said cutting body having a quadrangular cross section and at least two edges at one and the same end of said cutting body each forming cutting edges and selectively being movable on said stud into effective cutting position.

7. A cutting tooth link for saw chains which includes: a first section forming an elongated link body with a bottom surface for guidance in a guiding rail, a second section arranged at one end portion of said first section and extending in a direction transverse to the longitudinal direction and approximately in the plane of said first section and away from said bottom surface, a third section in the form of a stud protruding from said second section and extending in spaced relationship to and in the longitudinal direction of said first section, all of said sections forming a single integral piece with each other, and a cutting body having an opening therein corresponding in cross section to the cross section of said stud, said stud extending into said opening and having said cutting body firmly connected to said stud, said cutting body being formed by a sleeve adapted to be slipped onto said stud and provided with a slot extending in the longitudinal direction of said sleeve, said sleeve having an outer quadrangular contour with at least one outer rounded longitudinal edge, said sleeve also having an inner quadrangular contour with one side thereof being in alignment with a wall of said sleeve which defines one side of said slot.

8. A cutting link according to claim 1, in which at least one of the sidewall surfaces of the cutting body is inclined toward said first section, and in which said cutting body has a chest surface which is partially concave structurally.

9. A cutting link according to claim 1, which structurally forms an outer side link for a saw chain and has said longitudinally slot located on that link side which faces inwardly when said link is mounted on said chain securely.

10. A cutting link according to claim 1, in which said cutting body has a cutting edge which when seen from above is inclined progressively from the outside toward the inside of the saw chain and in a direction opposite to the cutting direction of the cutting link.

11. A cutting link according to claim 1, which includes a fourth section extending from the other end portion of said first section in approximately the same direction as said second section and forming a depth limitor before said stud.

12. A cutting link according to claim 1, in which at least one of the two parts respectively forming said two sections with said stud and said cutting body is a unitary stamped part.

13. A cutting link according to claim 1, in which the cutting body is a specific profile position of extruded bar stock material.